United States Patent [19]
Nishiyama et al.

[11] Patent Number: 4,761,061
[45] Date of Patent: Aug. 2, 1988

[54] METHOD FOR FABRICATION OF ELECTROCHROMIC DEVICE AND THE SAME FABRICATED BY THE METHOD

[75] Inventors: Hisashi Nishiyama; Seiichi Miyasaka, both of Yokohama; Tadatoshi Kamimori, Tokyo; Mamoru Mizuhashi; Akihiko Yoshihara, both of Yokohama, all of Japan

[73] Assignee: Asahi Glass Company Ltd., Tokyo, Japan

[21] Appl. No.: 906,377

[22] Filed: Sep. 12, 1986

[30] Foreign Application Priority Data

Sep. 19, 1985 [JP] Japan ................................ 60-205363
Sep. 19, 1985 [JP] Japan ................................ 60-205364

[51] Int. Cl.$^4$ .............................................. G02F 1/01
[52] U.S. Cl. .................................................. 350/357
[58] Field of Search ................... 350/357, 343; 252/408.1, 600; 29/400 D

[56] References Cited

U.S. PATENT DOCUMENTS 4,225,216 9/1980 Boyd et al. ...................... 350/357
4,447,133 5/1984 Miyoshi ............................ 350/357

FOREIGN PATENT DOCUMENTS 0065924 5/1980 Japan .............................. 350/343
0085735 7/1981 Japan .............................. 350/357

Primary Examiner—Eugene R. LaRoche
Assistant Examiner—Nathan W. McCutcheon
Attorney, Agent, or Firm—Oblon, Fisher, Spivak, McClelland & Maier

[57] ABSTRACT

A method for fabrication of an electrochromic device having perfect tight closure of the cell, wherein two or more banks constituting an external frame for the substrates are formed with use of a sealing material at the peripheral positions on the surface of the first or second substrate where the electrode has been formed; then a gel-like electrolytic solution is placed on the surface of the first substrate; thereafter the second substrate is disposed with the surface side thereof where the electrode has been formed being opposed to the surface side of the first substrate where the electrode has been formed; and finally both first and second substrates are laid one on the other to be contact-bonded, and wherein the two or more banks are composed of one or more cured inner bank and an uncured outer bank; when the uncured outer bank is in the two-stage structure having a height taller than that of the inner bank, and is of such two-stage structure composed of a cured bank having a height shorter than that of the inner bank and an uncured bank laminated on the cured bank, such inner bank is provided one or more in number; and when the uncured outer bank is in a single stage structure, the inner bank is provided two or more in number with a space interval being provided between them, both first and second substrates being joined together by the contact-bonding.

34 Claims, 3 Drawing Sheets

METHOD FOR FABRICATION OF ELECTROCHROMIC DEVICE AND THE SAME FABRICATED BY THE METHOD

BACKGROUND OF THE INVENTION

1. Field of the Invention

This invention relates to a method for fabrication of an electrochromic (EC) device, and to an electrochromic device fabricated by such method. More particularly, the present invention is concerned with a method for fabrication of an electrochromic (EC) device using a gel-like electrolytic solution as the electrolyte, and also with such electrochromic device manufactured by that method.

2. Description of Prior Art

For the electrolytic solution of electrochromic (EC) devices, there has so far been used mostly a solution-type electrolyte using, for example, propylene carbonate, etc. as the solvent, and lithium iodide (LiI), a mixture of lithium perchlorate and ferrocene, and so forth as the electrolytic substance. However, solution-type electrolytes had various disadvantages such that, when the substrate for the electrochromic device is broken, the electrolytic solution contained therein scatters over the surrounding area, or, when the substrates are pressed from outside, the opposite electrode formed on the inner surface of each of the substrates comes into mutual contact to cause short-circuit, or various other troubles and disorders. Further, as the method for fabrication of electrochromic devices using the solution-type electrolyte, there has usually been adopted such one, in which an injection port is perforated in one of the two substrates having a layer of an electrochromic substance formed on the surface side of at least one of the substrates where electrode is provided; then, after formation of a cell by opposing these two substrates with their surface sides where the electrode is provided facing each other, and sealing the circumference of these substrates with a sealing material (or, after formation of a cell by perforating in advance the injection port in the sealed part), the electrolytic solution is injected into the cell through the injection port; and finally the above-mentioned injection port is closed. This method, however, also possessed various disadvantages such that bubbles tend to remain easily in the cell; the electrolytic solution tends to overflow readily from the above-mentioned injection port; and the thus overflown electrolytic solution has to be removed and washed after closure of the injection port.

On account of this, studies and research have been continuously undertaken in recent years for an improved electrochromic device free from the above-mentione disadvantages, in which use is made of a gel-like electrolytic solution obtained by adding an appropriate gelling agent to the afore-mentioned solution-type electrolyte. However, even in this method of fabricating the electrochromic device using such gel-like electrolytic solution, there has still remained a problem as to how the electrolytic solution can be introduced into a space between a pair of substrates. In more detail, since the electrolytic solution is in gel-form, it is difficult to inject such gel-like electrolytic solution by way of the injection port into the above-mentioned cell after it is formed. On account of this, a method has so far been contemplated, by which the gel-like electrolytic solution is heated to lower its viscosity which enables it to be injected into the cell of the electrochromic device through the injection port, after which the electrolytic solution is cooled to increase its viscosity again. This method, however, was poor in its working efficiency. It had such disadvantages that it took a long time for the injection of the electrolytic solution to fill up the cell, and therefore was not suited for mass-production in an industrialized scale. Moreover, there has also been contemplated a method, according to which, prior to formation of the cell by applying the sealing material on and around the circumference of the substrates, the gel-like electrolytic solution is held between the two substrates; then this electrolytic solution is pressed between the substrates, followed by scrapping of the electrolytic solution which is forced out of the substrates as the result of the pressing, and cleaning of the peripheral area of the substrates; and finally the substrates with their peripheral area having been cleaned are sealed with the sealing material to form the cell for the electrochromic device. This method, however, was still not suited for industrialized mass-production, because the electrolytic solution to be forced outside is not uniform in pattern, which makes it difficult to carry out the scraping work efficiently. In addition, the surrounding seal for the cell is rendered imperfect by the scraping work with the result that durability of the cell would become insufficient.

With a view to solving these points of problem, the present inventors have already proposed a method for fabricating the electrochromic devices, which comprises: forming, with use of a sealing material, cured inner banks constituting the external frame and uncured outer banks on the surrounding positions over the surface of a pair of substrates at their surface side where the electrode is provided; placing a gel-like electrolytic solution on the surface of the substrate; and contact-bonding the substrates to join them together.

However, even this method for fabrication of electrochromic devices had its own problem in production efficiency, because of precise controls having been required of the space interval, height, contact-bonding conditions, etc. for both inner and outer banks. In addition, there was a possibility of the uncured sealing material to constitute the outer banks getting over the inner banks at the time of the contact-bonding to come into contact with the electrolyte, thereby giving mal-effect to the electrolyte. Furthermore, as this sealing material becomes cured, stress from deformation is imparted to the substrates by the inner banks which have already been cured and the outer banks which will have become cured after the former with the consequence that the optical distortion is brought about, which was liable to form double images in case the thus fabricated electrochromic device is used as a light-control mirror, or the like.

SUMMARY OF THE INVENTION

The present invention has been made with a view to eliminating disadvantages inherent in the conventional method for fabrication of electrochromic devices, and aims at providing an improved method for fabricating the electrochromic device and such device manufactured by the method. By the method of the present invention, it becomes possible to realize a sufficient and reliable seal without the gel-like electrolytic solution being forced outside of the cell, nor bubbles remaining therein after a single contact-bonding step. Moreover, risk of intrusion of the uncured outer sealing material into the electrolyte is considerably reduced; further, the working efficiency of the method is so satisfactory that it is suited for the continuous production in an industrialized mass-production with consequent reduction in production costs; and furthermore, stress to be imparted to the substrates becomes reduced to provide the cell having less optical distortion, and the seal of the cell is difficult to be exfoliated.

According to one aspect of the present invention, there is provided a method for fabrication of an electrochromic device, wherein, on the surface of at least one of first and second substrates, on both surfaces of which the electrode has been formed, a layer of an electrochromic substance is further formed, and then a gel-like electrolyte is held between the first and second substrates with the surface sides thereof, on which the electrodes have been formed, being faced inside, after which the substrates are sealed, the method for fabrication being characterized in that it comprises steps of:

(a-1) forming at least two banks constituting an external frame for the substrates with use of a sealing material at the peripheral positions on the surface side of said first or second substrate, where the electrode has been formed;

(a-2) placing a gel-like electrolytic solution on the surface of said first substrate;

(a-3) disposing said second substrate to cause the surface side of said second substrate, where the electrode has been formed, to oppose to the surface side of said first substrate, where the electrode has been formed; and (a-4) laying said first and second substrates one on the other and contact-bonding said both substrates;

wherein, said at least two banks are composed of at least one cured inner banks and an uncured outer bank, wherein (b-1) when said uncured outer bank is in a two-stage structure having a height taller than that of said inner banks, and is in such two-stage structure composed of an cured bank having a height shorter than that of said inner banks and an uncured bank laminated on said cured bank, said inner bank is provided one or more in number; and (b-2) when said uncured outer bank is in a single stage structure, said inner bank is provided two or more in number, each being disposed at a spaced apart relationship; and that (c) said first and second substrates are joined together by contact-bonding.

According to another aspect of the present invention, there is provided an electrochromic device of a type, wherein, on the surface side of at least one of first and second substrates where the electrodes have been formed, a layer of an electrochromic substance is further provided, and then an electrolyte is held between said first and second substrates with the surface side thereof, where the electrode has been formed, being faced inside, said electrochromic device being characterized in that it has at least three banks formed of a sealing material at the surrounding positions on the surface side of the first and second substrates where the electrodes have been formed, at least two of said banks disposed inside not bonding said first and second substrates, but at least one of said banks disposed outside said at least two inner banks bonding said both first and second substrates.

The foregoing object, other objects as well as specific construction and the manner of fabricating the electrochromic device according to the present invention will become more apparent and understandable from the following detailed description of several preferred embodiments thereof, when read in conjunction with the accompanying drawing.

BRIEF DESCRIPTION OF THE ACCOMPANYING DRAWING

DETAILED DESCRIPTION OF PREFERRED EMBODIMENTS

In the following, the method for fabrication of the electrochromic device according to the present invention will be described in detail in reference to the accompanying drawing.

Figure 1:
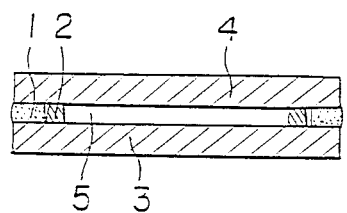
FIG. 1 is a cross-sectaional view showing one embodiment of the electrochromic device fabricated in accordance with the present invention.

FIG. 1 is a cross-sectional view of the electrochromic device manufactured by the first method of the present invention. FIGS. 2 to 7 are, respectively, cross-sectional views showing each representative step of the method for fabrication in accordance with the present invention.

FIG. 1 illustrates the electrochromic device, in which the first substrate (3) and the second substrate (4) are joined together by two banks (1, 2) constituting the surrounding frame with use of a sealing material, and a gel-like electrolytic solution (5) is filled in a space formed between the two substrates.

Figure 2:
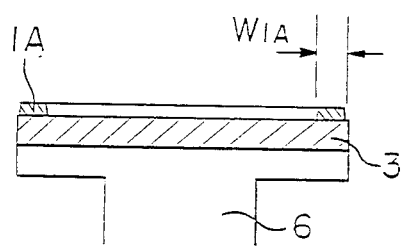
FIGS. 2 to 7 are respectively schematic cross-sectional views showing the process steps for fabricating the electrochromic device according to the present invention.

FIG. 2 shows formation of a first-stage bank (1A) of the outer bank (1), which can be done by feeding the sealing material by means of a dispenser, printing, and so forth, or by arranging preformed spacers, or others. In the case of the sealing material being uncured, it is subjected to curing. Also, depending on necessity, pressure is applied, in some cases, to adjust the bank to a desired height. By the way, this outer bank (1A) of the first stage is made lower than the inner bank to be formed later. The reason for this is that, if this outer bank of the first stage is lower than the inner bank, its surface needs not be so flat and smooth, hence it can be formed with ease.

Figure 3:
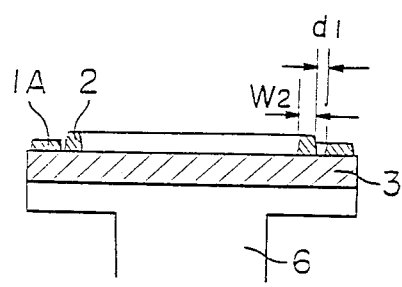

FIG. 3 illustrates subsequent formation of the inner bank (2). This can also be done by feeding the sealing material by means of a dispenser, printing, and so forth, or by arranging preformed spacers, or others, as is the case with the outer bank. When uncured sealing material is used, it has to be cured. Also depending on necessity, a pressure is applied, in some cases, to adjust the bank to a desired height.

Figure 4:
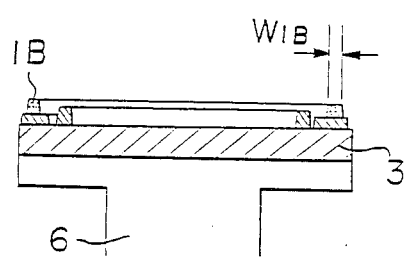

FIG. 4 illustrates formation of a second-stage outer bank (1B) on the cured first-stage outer bank (1A). This second-stage outer bank (1B) is combined with the first-stage outer bank (1A) in its uncured condition in such a manner that the total height of the two combined banks may be taller than the inner bank (2), and that this uncured bank may be crushed at a later step, when the substrates are subjected to contact-bonding.

Figure 5:
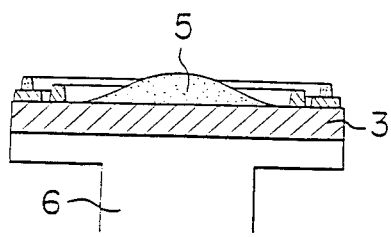
Figure 6:
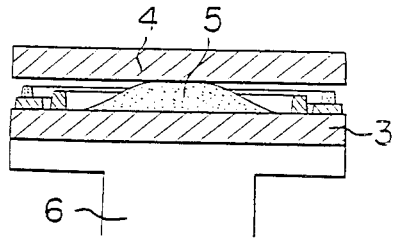
Figure 7:
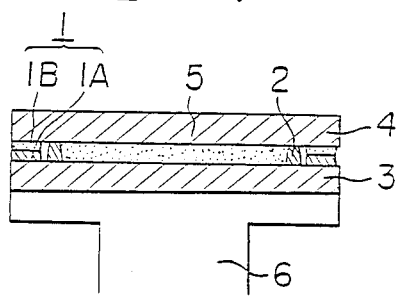

FIG. 5 shows the gel-like electrolyte (5) having been placed on the surface area of the first substrate (3) surrounded by the banks. FIG. 6 shows the second substrate (4) having been placed over the top surface of the electrolyte (5) to be pressed down for the contact-bonding with the first substrate (3), an FIG. 7 shows a state of the two substrates having been bonded together under pressure.

Figure 8:
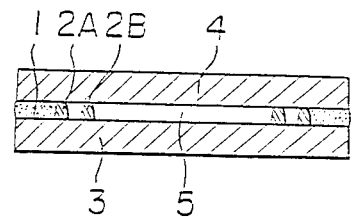
FIG. 8 is a cross-sectional view showing another embodiment of the electrochromic device fabricated in accordance with the present invention.

FIG. 8 is a cross-sectional view of the electrochromic device fabricated by the second method of the present invention. FIGS. 9 to 13 are respectively cross-sectional views illustrating, in sequence, the representative steps for the fabrication of the electrochromic device according to the present invention.

FIG. 8 shows the electrochromic device fabricated by joining the first and second substrates (3, 4) by way of three banks (1, 2A and 2B) constituting the surrounding frame using a sealing material, the gel-like electrolytic solution (5) being filled in the interior space defined by these first and second substrates and the surrounding frame.

Figure 9:
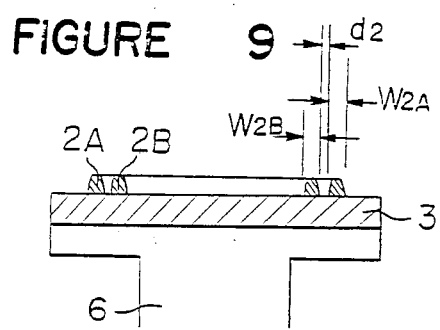
FIGS. 9 to 13 are respectively schematic cross-sectional views showing the process steps for fabricating the electrochromic device according to another embodiment of the present invention.

FIG. 9 illustrates formation of the two inner banks (2A, 2B). This can be done by supplying the sealing material by means of a dispenser, printing, and so forth, or by arranging preformed spacers. In the case of the sealing material being uncured, it is subjected to curing. Also, depending on necessity, a pressure is applied, in some cases, to adjust the banks to their desired height.

Figure 10:
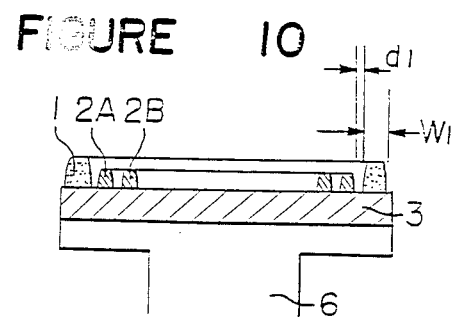

FIG. 10 illustrates further formation of an outer bank (1) outside the inner banks (2A, 2B). This outer bank is made taller than the inner banks, and crushed at a later step, when the substrates are mutually contact-bonded.

Figure 11:
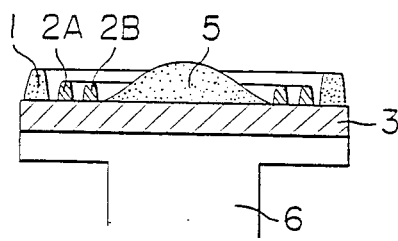
Figure 12:
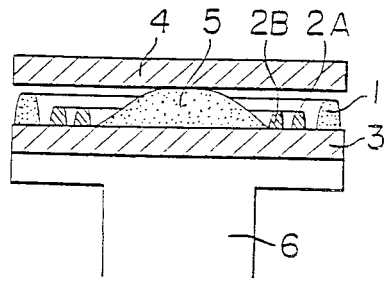
Figure 13:
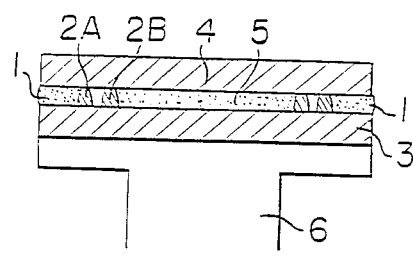

FIG. 11 shows the gel-like electrolyte (5) having been placed on the surface area of the first substrate (3) surrounded by the banks. FIG. 12 shows the second substrate (4) having been placed over the top surface of the electrolyte (5) to be pressed down for the contact bonding with the substrate (3); and FIG. 13 shows a state of the two substrates having been bonded together under pressure.

In these figures of drawing, the first substrate (3) made of glass or plastics and placed on a substrate placement table (6) has an electrode (not shown in the drawing) formed on its surface, and, depending on necessity, a layer of the electrochromic substance (not shown in the drawing) formed on the electrode. Onto this first substrate (3), a certain definite quantity of the sealing material is placed in a desired pattern by means of a sealing material feeding device such as, for example, a printer, a dispenser, and so forth, thereby forming at the peripheral positions on the first substrate (3) the outer bank (1) composed of two-staged banks, (1A, 1B), which has a predetermined width and thickness and which constitutes the external frame for the substrate, and an inner bank (2); or the single stage outer bank (1) and two inner banks (2A, 2B).

These banks (1, 2, 2A and 2B) may also be formed on the substrate by placing a film in the form of a frame or a strand of a plurality of filaments made of high molecular weight material, not by means of the sealing material feeding device.

The substrate, on which this sealing material is to be fed, may, of course, be the one without the layer of the electrochromic susbstance having been formed thereon. The substrate may also have the banks formed on it in such a manner that the inner banks using the sealing material is formed on the first substrate, while the outer banks using the sealing material is formed on the second substrate; or the two-staged outer banks are each formed on a separate substrate or a single-state outer bank is divided into two parts to be placed each on a separate substrate, after which these two substrates are contact-bonded for lamination of these divided banks; or the two inner banks are each provided on a separate substrate.

As the electrode to be formed on the substrate, there may be used tin oxide ($SnO_2$) or indium tin oxide (ITO), or others. When the electrochromic device according to the present invention is used as a light-controlling mirror, there may also be used titanium nitride, hafnium nitride or other metal compounds having reflectivity. As the electrochromic substance, use is made of tungsten oxide ($WO_3$), molybdenum oxide ($MoO_3$), and so forth. It might be convenient that a solder is attached onto the end part of the first substrate (3) so as to be used as a connecting terminal for the electric current feed line for supply of an electric voltage to the electrode.

The outer bank (1) is to actually bond two substrates. When the inner bank is divided in two or more rows, the outer bank may be in a single stage and is formed with a height taller than a plurality of inner banks to be described later, which will be rendered to have substantially the same level as that of the inner banks by the contact-bonding of the substrates. Such outer bank may usually have its width of 0.5 to 10 mm and its height of 1.2 to 3 times as high as that of the inner banks at the time of feeding the sealing material, though it depends upon an area and thickness of the substrate used, for which the required strength of the sealing differs. This outer bank, at the time of the contact-bonding of the substrates, is crushed and spread laterally to increase its width of 1.2 to 3 times or so as broad as the initial width, on account of which it is preferable that a certain amount of space interval be provided between the outer bank (1) and the inner bank (2A). The most ideal is that, after the contact-bonding, this inner bank (2A) and the outer bank (1) be brought into close contact each other so that they may form a single bank. In this instance, since the inner bank is provided in two or more rows with a space interval being formed between them, even when the sealing material constituting the outer bank gets over the adjacent inner bank (2A), another inner bank (2B) situated inside the inner bank (2A) prevents the uncured sealing material constituting the outer bank from coming into contact with the electrolyte within the cell of the electrochromic device. On the contrary, even when the electrolyte within the cell is in a large amount and tends to get over the inner bank (2B), it is intercepted at another inner bank (2A) so as not to be forced out to the bonded surface between the outer bank and the substrate, hence there is no possibility of the bonding strength of the seal becoming lowered. When a single inner bank is provided, instead of two inner banks, highly precise controls are required of its space interval, height, and other factors. However, since the present invention provides sufficient freedom in these control parameters, the production efficiency of the electrochromic device is fairly improved.

When the inner bank is provided in a single row, this outer bank (1) is formed in a two-stage structure. It goes without saying that, even if this inner bank is divided into two or more rows, the outer bank may be formed in the two-stage construction. In the case of forming the outer bank in the two-stage construction, the first-stage bank is cured before the second-stage bank is laid on it, and yet it is formed with a height shorter than that of the inner banks. Usually, the first-stage bank may be formed with a height of about 50% to 90% shorter than that of the inner banks. The width $W_{1A}$ of this first-stage bank may be usually in a range of 1 to 20 mm or so after its curing, although it depends on an area and thickness of the substrate used, for which required strength of the seal differs.

The second-stage bank is for bonding the two substrates, and, in order to enable the contact-bonding to be carried out satisfactorily at a later process step, the total height of these first-stage and second-stage banks is made taller than that of the inner banks. The width $W_{1B}$ of this second-stage bank may usually be in a range of from 0.5 to 10 mm or so at the time of feeding the sealing material, although it also depends on an area and thickness of the substrate used, for which required strength differs. It is formed with a narrower width than that of the first-stage bank, which will be laterally spread at the time of the contact-bonding of the substrates to put them togetaher.

At the time of the contact-bonding of the two substrates, this second-stage outer bank is crushed and spread laterally on the surface of the first-stage outer bank (1A) under pressure exerted on the substrates, thereby increasing its width about 1.2 to 3 times as broad as its original width to bond the substrates together. Even if the sealing material for this second-stage outer bank is excessive in quantity, since the quantity of the uncured sealing material for the second-stage outer banks is smaller than that of the uncured sealing material for constructing the single-stage outer bank, this excessive quantity of the sealing material spreads toward the lateral surface of the first-stage bank, but it is difficult to reach the inner bank (2) and further inside thereof with the consequence that there is the least possibility of the uncured sealing material getting into contact with the electrolyte to give mal-effect to it. Moreover, by providing a certain amount of space $d_1$ (usually, about 0.2 to 5 mm or so) between this outer bank and the inner bank, the above-mentioned danger of contamination of the electrolyte further decreases. At the same time, by forming the first-stage bank beneath the second-stage bank to be bonded to the substrate in advance, the bonded surface of the sealing material for the second-stage bank is difficult to be contaminated by the electrolyte, even when its feeding quantity is excessive and forced out of the inner bank at the time of the contact-bonding of the substrates. Owing to such arrangement of the banks, the reliability in the bonding of the sealing material becomes improved.

As illustrated in FIGS. 2 to 7 inclusive, this outer bank may be formed in the two-staged structure on one of the substrates; or each of these two banks is formed on a separate substrate to be put together later at the time of the contact-bonding of the substrates; or it may be formed in the three-stages structure, one of which, corresponding to the first-stage bank, may be formed in its cured condition on each of both substrates, and then the third one of which, corresponding to the second-stage bank, may be formed in its uncured condition between the first-stage banks, each having been formed already on each of the two substrates. In the case of the three-staged structure of the bank, it is necessary that the total height of the first-stage banks to be formed on each of the substrates be made shorter than that of the inner bank.

Furthermore, even when the outer bank is formed in the two-staged structure, the inner bank may also be provided in two or more rows with an appropriate space interval being provided between adjacent ones. In this manner, even when it may happen that the sealing material for the outer bank gets over the first inner bank, it is hindered its advancement by the second and further inner banks, whereby possibility of contact between the electrolyte within the cell and the uncured sealing material for the outer bank may be made more remote owing to this second and further inner banks.

On the contrary, when the electrolyte is in an excessive quantity and tends to get over the second inner bank to the side of the electrolyte, it is hindered its advancement by the first inner bank (outside the second inner bank), whereby the electrolyte is not forced out to the bonding surface between the outer bank and the substrate with the consequence that the bonding strength of the seal does not decrease, hence the reliability of the seal can be maintained.

As described in the foregoing, by thus forming the outer bank in the two-staged structure with the first-stage bank being cured prior to the contact-bonding of the substrates, the quantity of the sealing material to be cured at the time of the contact-bonding may be kept minimum, the stress imparted to the substrates by the adhesion becomes decreased, and the optical distortion in it becomes low. As the result of this, when the electrochromic device according to the present invention is used as a light controlling mirror or other optical purposes, it is least liable to cause disadvantageous effect such as double-image formation, etc.

Further, when the outer bank is formed in a single-stage structure, its thickness is usually made twice as thick as the final thickness after the contact-bonding, so that the sealing material for this second bank must be formed with a fairly large thickness by printing or other expedients, hence the thickness control is difficult. However, by forming this outer bank in the two-stage structure, the thickness of the bank for second stage may be made much thinner, on account of which more freedom in the working step can be given, which contributes much to the production efficiency.

The sealing material for forming the outer bank (1) may be of the same kind in both first and second stages, in case this outer bank is formed in the two-staged structure, or it may be of different kinds. In either case, the first-stage bank should be cured before the second-stage bank is formed thereon. As the sealing material, there may be used those adhesive polymers capable of being contact-bonded under heat of from 50° C. to 200° C., such as epoxy type adhesives, or those photo-curable type adhesives, or those others having high adhesive strength, low permeability to gases (in particular, oxygen gas), good moisture-resistance, weather-resistance and chemical-resistance, and further being capable of crushing and spreading to an appropriate degree at the time of the contact-bonding of the substrates under pressure being applied to the second substrate, thereby perfectly closing and fixing the first and second substrates. Such sealing material in either form of paste, film, filament, or melt is applied onto the first substrate (3) or the second substrate (4) by screen-printing or by use of a dispenser and other devices, thereby forming the outer bank (1) in the single-stage structure or the two-staged structure. When the outer bank is formed in the two-staged structure, the first-stage bank may be formed on the first substrate (3) and the second-stage bank may be formed on the second substrate (4).

The adhesive polymers having the above-mentioned properties are exemplified as follows: ethylene vinyl acetate, melamine, epoxy, ionomer, ethylene ethyl acrylate, ethylene acrylate, nylon, urethane, silicone, butyl rubber, and so forth. Further, when those silane coupling materials, inorganic or organic fillers, and the like are added to these adhesive polymers, much more improved properties may be obtained in various aspects such as the adhesive strength, the gas impermeability, and so on. Also, when the first substrate (3) and the second substrate (4) are subjected to the primer treatment in advance, more desirable properties may result.

As mentioned in the foregoing, this sealing material for the outer bank may be supplied to the substrate where the sealing material for the inner bank has not been supplied, thereby forming the outer bank, or it may be fed to both substrates. The uncured outer bank may be pre-cured as far as adverse effect is not given to both the first and second substrates to be bonded later. The pre-cured outer bank makes the bonding operation easy.

The bank (2) or the banks (2A, 2B) are formed as the inner banks, and are cured at least prior to supplying the electrolyte to such an extent that it may not give maleffect to the electrolyte and that it may not be deformed so remarkably. The inner bank or banks are directly adhered to one of the substrates.

When the outer bank (1) is in the single-stage structure, the inner bank is formed in two-row arrangement. It is however preferable that, even when the outer bank is in the two-staged structure, the inner bank is formed in the two-row arrangement as mentioned above with an appropriate space interval being provided between them. In this case, if this space interval $d_2$ is taken too wide, the effective area of the electrochromic device becomes sacrificed, hence the space interval should be kept minimum necessary, which is usually 1 mm or less. It is, of course, possible that, in the case of fabraicating a large-sized device, this space interval can be made broader.

This inner bank may have its width in a range of from 0.3 to 5 mm or so in either case of its being arranged in a single row or in a plurality of rows. In the case of manufacturing a large-sized device, the width of each bank may have an increased width and the height thereof may be in a range of from 20 $\mu$m to a few millimeters.

By thus forming the inner sealing banks in two or more rows with an appropriate space interval being provided between them, there is no possibility of the sealing material for the outer banks coming into contact with the effective electrolyte within the device, even when it is in an excessive quantity and forced out to the interior of the device. On the contrary, even when the gel-like electrolyte is fed in an excessive quantity and is therefore forced outside, it is less likely to contaminate the bonding surface between the sealing material for the outer bank and the substrate, hence there is the least possibility of insufficient sealing being brought about.

As the consequence of this, there may increase freedom in the working steps for the formation of the banks as well as feeding of the electrolyte, which contributes to remarkable improvement in the working efficiency.

As the sealing material for forming the inner bank (2) or the inner banks (2A, 2B), there may preferably be used those which are not so remarkably deformed under pressure or heat at the time of the contact-bonding of the substrates, have a function of controlling the space interval or gap between the adjacent banks, and which possess the blocking function to prevent the gel-like electrolytic solution within the cell from reaching the sealing material for the outermost bank at the time of the contact-bonding of the substrates, and moreover which have good chemical-resistant property.

Examples of such sealing material are: thermoplastic resins such as polyethylene, polypropylene, polyester, polystyrene, polyvinyl chloride, ethylene vinyl acetate, ionomer, ethylene ethyl acrylate, polyvinylidene chloride, ethylene acrylate, nylon, polycarbonate, polyethylene fluoride, and so forth; thermosetting, photo-curable, or electron-beam-setting resins such as epoxy, silicone, melamine, unsaturated polyester, polyester acrylate, and so forth; various inorganic materials such as glass, silica, alumina, titania, and others; and mixtures of these materials.

Any of these sealing materials is arbitrarily selected, and applied onto the first substrate (3) or the second substrate (4) in the form of a film, or by screen-printing, or by a dispenser or other appropriate feeding devices, thereby forming the inner bank (2) or banks (2A, 2B).

When this sealing material for the inner bank is supplied in its uncured condition, it should be cured before the contact-bonding of the substrates to form the cell so that it may not be readily crushed at the time of the contact-bonding and curing of the sealing material for the outer bank.

For this purpose, a spacer material for controlling the cell gap such as, for example, glass beads, plastic beads, ceramic granules, and others, is mixed into the sealing material for this inner bank; thereafter, the sealing material is pressed by a plate of fluorine-containing resin, etc. which does not adhere to the sealing material, thereby regulating the height of the inner bank formed by the sealing material to a predetermined value.

Production of the electrochromic device may preferably be increased, if the sealing material for both inner and outer banks is applied onto the substrate by the printing method such as the screen-printing method, and so forth. When the outer bank is formed in the single stage structure, and the inner bank is formed in two or more rows of arrangement, the sealing material for the inner bank is first printed and cured to form the two rows of the inner banks (2A, 2B), after which the sealing material for the outer bank is printed to form the uncured outer bank (1). Further, when this outer bank is formed in the two-staged structure, the sealing material for the first-stage outer bank is first printed and cured to thereby form the first-stage outer bank (1A), then the sealing material for the inner bank is printed and cured to form the inner bank (2). After completion of forming these first-stage outer bank (1A) and the inner bank (2), the sealing material for the second-stage outer bank is printed to form the uncured second-stage outer bank (1B).

The number of the banks is usually as follows: when the outer bank is formed in the single-stage structure, there will be a single row of the outer bank and two rows of the inner banks; when the outer bank is formed in th two-staged structure, there will be a single row of the outer bank and a single row of the inner bank, with which various functions of the electrochromic device can be sufficiently attained. In the case, however, of a higher degree of hermetic closure, blocking property, durability, and so forth being required, the number of the banks may be increased as the case may be.

In FIGS. 5 and 11, the gel-like electrolytic solution is placed in a certain definite quantity on the surface area of the first substrate (3) surrounded by the inner bank (2) or (2B) by means of an electrolytic solution feeding device such as a dispenser, and so on. While the gel-like electrolytic solution may be uniformly coated over the entire surface of the first substrate (3) as enclosed by the inner bank (2) or (2B), using the printing method, the transfer method, the knife-coating method, and so forth, there is such a possibility in this case that bubbles are prone to remain in the electrolyte when the second substrate is placed on it, because, as will be mentioned later, the contact-bonding of the substrates is carried out in the vacuum in the presence of a small amount of gas such as nitrogen ($N_2$) gas, etc., hence bubbles of nitrogen gas.

It is therefore desirable that the gel-like electrolytic solution (5) is heaped up at the center part of the upper surface of the first substrate (3) so that it may be spread over the entire surface of the substrate by the pressure applied onto the second substrate. In this case, there may be contemplated various ways of placing the gel-like electrolytic solution (5) on the surface of the first substrate (3) such that it is disposed in a substantially rectangular shape along the inner bank; it is disposed in a multitude of dots which are equally spaced apart; it is disposed uniformly in a circular form or in the form of a star shape; or it is disposed at the center part of the substarate surface in a relatively large mass with small masses being arranged on the surrounding portion of the large mass. Of these various ways of placing the gel-like electrolytic solution, the one, in which a relatively large mass is placed at the center part of the substrate surface with small masses being placed in the vicinity of the four corners of the substrate surface to supplement any shortage in the spreading of the gel-like electrolytic solution in the large mass form, is considered best, because the least bubbles remain in the electrolyte in this way.

The placement of the gel-like electrolytic solution (5) on the first substrate (3) is carried out in the nitrogen gas atmosphere so as to avoid oxidation of the electrolyte. Viscosity of the gel-like electrolytic solution (5) should desirably be in a range of from 500 cps to 50,000 cps. Adjustment of viscosity of the gel-like electrolytic solution (5) may be effected by heating, cooling, or dilution with a solvent.

The material for the gel-like electrolytic solution may be selected from the following: those resins such as urethane resin, acrylic resin, polyvinyl butyral, and other resins which become gel by being dissolved in an organic solvent such as $\gamma$-butyrolactone ($\gamma$-BL), propylene carbonate, butyl alcohol, and so on; or copolymers of these resins. In addition, it is desirable to use those resins added with the redox agent such as benzoquinone, chloro-quinone, hydroxy-quinone, naphtho-quinone, azobenzene, hydrazobenzene, azoxybenzene, phenylhydrazine, ferrocene, nickelocene, titanocenedichloride, dimethyl-tin-dichloride, iron chloride, copper nitrate, methylene-blue, lithium iodide, zinc iodide, ammonium iodide. (It is particularly preferable to use lithium iodide (LiI) because it provides a source of lithium ions.) However, the materials for the gel-like electrolytic solution are, of course, not limited to these examples alone.

In this contact-bonding step, the second substrate (4) is held in a substrate holder, is brought into contact with the top surface of the gel-like electrolytic solution (5), and then pressed down to be contact-bonded, as shown in FIGS. 6 and 7 as well as FIGS. 12 and 13. This contact-bonding step is carried out in a vacuum vessel (not shown in the drawings). More particularly, the process step should preferably be done in the nitrogen gas atmosphere, in which the pressure of the residual nitrogen gas should desirably be maintained in a range of from 1 to 60 Torr, or so. Further, the temperature of the substrate placement table (6) should preferably be maintained at a level which is slightly higher than the normal temperature and also at such a level that does not cause deterioration in the resulting electrochromic device. Desirably, it is usually 50° C. or so. The reason for the above-mentioned limitations to the degree of vacuum and the temperature for the contact-bonding is that, when the vacuum degree or the temperature is too high, the solvent in the electrolytic solution (5) begins to vaporize to bring about bubbling; on the other hand, when the vacuum is too low, there would be high possibility of bubbles remaining in the cell when the second substrate (4) is bonded to the first substrate (3) under pressure to form such cell for the electrochromic device.

The electrode to be formed on this second substrate (4) may be selected, as is the case with the electrode for the first substrate (3), from those metal compounds such as $SnO_2$, ITO, TiN, or others. When the layer of the electrochromic substance is not formed over the electrode on the first substrate (3), the layer of the electrochromic substance such as $WO_3$, and so on is formed over the electrode on this second substrate (4) instead. By the way, it should be noted that both electrode and the layer of the electrochromic substance are not shown in the drawing, as is the case with the first substrate (3).

Subsequently, as shown in FIGS. 7 and 13, the second substrate (4) is pressed toward the first substrate (3) from its back surface to complete the contact-bonding of the substrates. This process is conducted in a vacuum vessel (not shown in the drawing) containing nitrogen gas under a pressure in the range of from 1 to 60 Torr, as is the case with the process step shown in FIGS. 6 and 12, during which the second substrate (4) is contact-bonded to the frrst substrate (3) by means of a known pressing device, thereby forming the cell with the entire periphery of the two substrates having been sealed by the sealing material.

In this case, the temperature of the pressing device in the vacuum vessel is maintained at a temperature ranging from a room temperature to 200° C., and the pressure for the contact-bonding between the first substrate (3) and the second substrate (4) is maintained in a range of from 0.3 kg/cm$^2$ to 5 kg/cm$^2$, or preferably from 0.5 kg/cm$^2$ to 2.0 kg/cm$^2$, the temperature and pressure ranges of which are favorable in point of the full spreading of the electrolytic solution, adequate contact-bonding of the sealing material to each of the substrates (3, 4), and therefore fabrication of the electrochromic device free from the optical distortion.

As the second substrate (4) is pressed downward from its back surface by the pressing device, the front surface of the substrate (4) first presses the gel-like electrolytic solution (5) which is then spread over the surface of the first substrate (3) and comes into contact with the surrounding bank (2) or (2B), along which the electrolytic solution further spreads. In the course of this spreading of the gel-like electrolytic solution, even if such gel-like electrolyte tends to get over this inner bank (2B), it is hindered its surpassing to the bonded surface between the outer bank and the substrate owing to the row of the first inner bank (2A) disposed outside the second inner bank (2B), in case the inner bank is formed in the two-row arrangement. At the same time, the uncured outer bank (1) comes into contact with the surface of the second substrate (4) to cause the contact-bonding between the substrates (3) and (4) under pressure applied to the second substrate (4), thereby bonding the entire periphery thereof and hermetically sealing the interior of the cell. In this instance, the gel-like electrolytic solution in the cell has been fed in quantity sufficient to fill the interior space defined by the substrates, on account of which the gel-like electrolytic solution is spread in the entire space with the least bubbles remaining in it. In particular, since the inner bank is provided in the double rows with a space interval being formed between them, even if the gel-like electrolytic solution is in an excessive quantity, and it happens that the electrolyte tends to get over the bank (2B) at the time of the contact-bonding of the substrates, it is prevented by the bank (2A) situated outside the bank (2B) from overflowing to a outside. In other words, the inner banks play a role of blocking member to hinder the gel-like electrolytic solution from its reaching the outer bank (1).

Furthermore, in the case of the outer bank being formed in the two-stage structure, even if it happens that this gel-like electrolytic solution gets over the inner bank (2), there is the least possibility of the electrolyte contaminating the bonded surface of the outer bank with the substrate, because of a space interval being provided between the inner bank and the outer bank, and because of one of the outer bank in the two-stage structure having been already cured. This danger may possibly be reduced further if the inner bank is formed in the two-row arrangement with a space interval being formed between them.

At the same time, the uncured outer bank (1) comes into contact with, and is pressed by the surface of the second substrate (4) to realize the contact-bonding between the substrates (3) and (4) under pressure imparted to the second substrate (4) from its back surface, thereby tightly closing the interior of the cell on its entire periphery thereof. In this case, since the gel-like electrolytic solution has been fed in quantity sufficient to fill the whole interior space of the cell, it is perfectly and uniformly spread in the interior space without leaving bubbles therein to a substantial degree. According to the present invention, since a part of the outer bank is cured, even if the gel-like electrolytic solution is in a slightly excessive quantity, and it happens that the electrolyte overflows from the inner bank (2) at the time of the contact-bonding between the substrates, it in no way affects badly to the bonded surface between the outer bank and the substrate owing to the first stage of the outer bank (1A) which has been cured and bonded to the substrate (3).

The size of the cell gap depends on the pressure to be imparted to the second substrate (4), the temperature of the pressing device, and the quantity of the gel-like electrolytic solution (5). It is, however, mainly governed by the height of the inner bank (2) or the banks (2A and 2B).

In the above-described manner, the gel-like electrolytic solution (5) is filled in the cell defined by the first and second substrates (3 and 4) and the banks (1A, 1B and 2) or (1, 2A and 2B). In addition, by holding the cell in this state in the vacuum vessel for several minutes, while heating and applying pressure thereto, the bonding of the sealing material for the bank (1) to both substrates (3 and 4) is completed to result in a rigid cell for the electrochromic device. After this, nitrogen or other gas is introduced into this vacuum vessel to remove the reduced pressure condition and bring the interior of the vessel to the atmospheric pressure, followed by taking out the cell from the vacuum vessel into atmosphere, whereby, even if the bubbles remain in the cell, they are extinguished under the atmospheric pressure and the gel-like electrolytic solution (5) is perfectly filled in the cell. As a consequence of this, there can be fabricated a the cell free from bubbles in the electrolyte.

When the thermosetting type adhesive agent such as epoxy resin, the photo-curing type adhesive agent is used as the sealing material for the uncured outer bank (1) or (1B), the cell is subjected to further heating or light irradiation, depending on necessity, after it has been taken out of the vacuum vessel into the atmosphere, thereby completing the curing reaction.

By the afore-described process steps, the cell for the electrochromic device is completed, and sufficient durability of the electrochromic device can be secured with the banks (1, 2) or (1, 2A and 2B) formed of the sealing material. However, additional formation of a layer of peripheral sealing material of those adhesive materials such as butyl rubber, fluorine-containing resin, epoxy resin, and so forth on the outside of the bank (1) formed of the selling material may further strengthen the cell to increase its durability.

FIGS. 14 to 19 illustrate other examples of application of the present invention.

Figure 14:
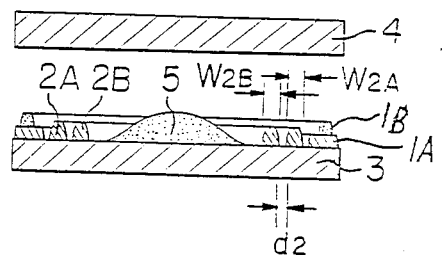
FIGS. 14 to 19 are also schematic cross-sectional views showing various arrangements of the banks for fabricating the electrochromic device according to the present invention.

FIG. 14 shows an example, in which two rows of inner banks (2A) and (2B) as cured are formed on the first substrate (3) with their respective widths of $W_{2A}$ and $W_{2B}$, and a space interval between them of $d_2$, and, at the same time, the outer bank (1) in the two-stage structure composed of the cured first-stage bank (1A) and the uncured second-stage bank (1B) is formed. At the time of the contact-bonding of the substrates (3) and (4), the sealing material forming this uncured second-stage bank (1B) is crushed and enters into the space between the banks (2A) and (2B). With this construction of the cell, even if the electrolyte is used in a fairly excessive quantity, it is less likely to get over the inner banks at the time of the contact-bonding of the substrates (3) and (4) to possibly contaminate the bonded surface between the outer bank and the substrate.

Figure 15:
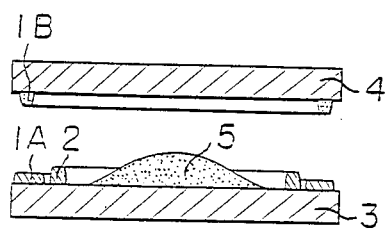

FIG. 15 illustrates a case, wherein the first-stage outer bank (1A) cured and the inner bank (2) cured are formed on the first substrate (3), while the uncured second-stage outer bank (B) is formed on the second substrate (4).

Figure 16:
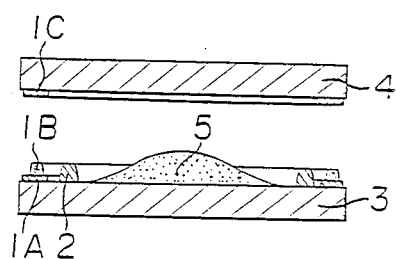

FIG. 16 illustrates a case, wherein the cured first-stage outer bank (1), the uncured second-stage bank (1B) and the cured inner bank (2) are formed on the first substrate (3), while the cured first-stage outer bank (1C) is formed on second substrate (4). In this embodiment, the cured outer bank is formed on each of the two substrates, wherein the total thickness of both first-stage outer banks (1A and 1C) is made thinner than that of the inner bank (2).

Figure 17:
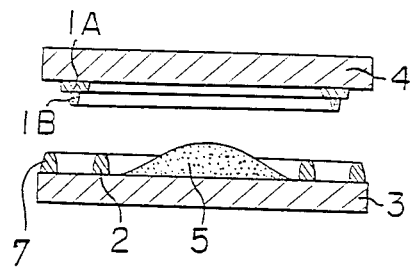

FIG. 17 illustrates a case, wherein the cured inner bank (2) and the cured third bank (7) disposed outside the two-staged outer bank (1A and 1B) are formed on the first substrate (3), while the above-mentioned two-staged outer banks (1A and 1B) are formed on the second substrate (4). It is desirable to form the cured first-stage outer bank 1A on the substrate having the inner bank (2), i.e. the substrate for receiving the gel-like electrolytic solution. In this case, contamination of the bonding surface between the outer bank 1A and the substrate does not easily occur even though the gel-like electrolyte gets over the inner bank. The above-mentioned construction is illustrated in the embodiment as shown in FIGS. 2 to 7 in comparison with the embodiment as shown in FIG. 17.

Figure 18:
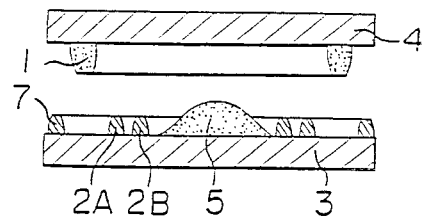

FIG. 18 shows an embodiment, wherein the two rows of the inner banks (2A and 2B) are formed on the first substrate (3), with further addition of a fourth bank (7) which is to be disposed for outside of the outer bank (1) according to the present invention, while this outer bank (1) according to the present invetion is formed on the second substrate (4), thereby further improving the reliability of this outer bank (1). Incidentally, it should be noted that, of these banks to be formed on the substrates, the banks (2A, 2B and 7) are made to have the same height and cured at the time of the contact-bonding of the substrates, and the outer bank (1) is kept in an uncured condition.

Figure 19:
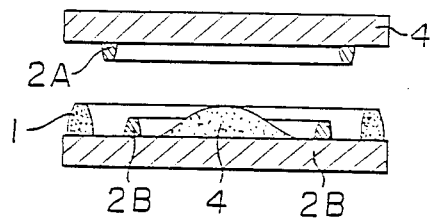

FIG. 19 illustrates an embodiment, wherein the inner banks are each formed on both substrates; that is to say, the inner bank (2B) is formed on the first substrate (3), while the inner bank (2A) is formed on the second substrate (4); and the uncured outer bank (1) is formed on the first substrate (3).

Besides the above-mentioned embodiment, the present invention is capable of various applications such as further increase in the number of the banks, lamination of such banks, and so forth.

Further, the electrochromic device thus manufactured is provided with a drive terminal for driving the same. As an example, an electrically conductive paste for baking, a layer of an eletrically conductive material and a metal, or a layer of solder is formed on one end part of the first and second substrates (3, 4), which is used for soldering the electric current feed lines to be conneted with an external power source. It may, of course, be permitted that a lead pin is formed on this end part, and a metal fitting is attached onto the lateral surface of the cell.

With a view to enabling those persons skilled in the art to put the present invention into practice, preferred examples of the method for fabrication of the electrochromic device according to the present invention are presented.

EXAMPLE 1

15 g of dehydrated polyvinyl butyral was dissolved into 50 ml of γ-butyrolactone solution of 0.75M of lithium iodide (LiI) which had been deoxidized and dehydrated, in a nitrogen gas atmosphere, thereby preparing the gel-like electrolytic solution.

Then, on one side of a glass substrate of 10 cm square, an electrically conductive paste for baking was printed and baked as a lead wire fitting part. After washing, the glass substrate, on which an ITO (Indium tin oxide) film alone was formed by the vapor-deposition method on the side of the lead wire fitting part thereof, was made the first substrate (3); on the other hand, another substrate, on which a $WO_3$ layer was formed as the electrochromic substance layer by the vapor-deposition method over the ITO film, was made the second substrate (4). The surface resistance of this ITO film was 10 $\Omega/cm^2$, and thickness of the $WO_3$ layer was 5000 Å.

In the next place, a hot-setting type epoxy adhesive was coated by the screen printing on the surface of the ITO film on the first substrate (3), as shown in FIG. 2, thereby forming the first-stage outer bank (1A). This first substrate (3) was maintained at a temperature of 120° C. for 30 minutes to cure the epoxy adhesive constituting the outer bank (1A), which was made to have its thickness of approximately 40 μm and its width $W_{1A}$ of 2.5 mm. Subsequently, as shown in FIG. 3, the same epoxy adhesive was coated by the screen-printing inside the above-described first-stage outer bank (1A) to thereby form the inner bank (2), after which the substrate was maintained at a temperature of 130° C. for 30 minutes to cure the epoxy adhesive so that it had thickness of approximately 50 μm, width $W_2$ of 0.5 mm and a space interval $d_1$ between the outer and inner banks of 0.3 mm.

Subsequently, as shown in FIG. 4, a thermosetting type epoxy adhesive was coated by the screen-printing on the first-stage outer bank (1A) to thereby form the second-stage outer bank (1B). This uncured second-stage outer bank (1B) had its width $W_{1B}$ of 2 mm and its thickness of approximately 50 μm. The both first-stage and second-stage banks were combined to form the outer bank (1) having the total height of approximately 90 μm.

Thereafter, on the surface of the first substrate enclosed by the inner bank (2), there was applied the afore-mentioned gel-like electrolytic solution in a quantity of 0.53 g by means of a dispenser. This process step was carried out in the vacuum vessel charged therein with nitrogen ($N_2$) gas to render it the inactive atmosphere. Subsequently, nitrogen gas was purged to reduce the pressure within the vacuum vessel to 30 Torr, and the surface of the $WO_3$ layer of the second substrate (4), on which both ITO film and $WO_3$ layer had been formed, was opposed to the surface of the ITO film of the first substrate (3) in such a manner that this second substrate could be placed on the mass of the above-mentioned gel-like electrolytic solution, followed by pressing the second substrate (4) from its back surface by means of a pressing device. At the time of pressing this second substrate, the pressure was maintained at 1 $kg/cm^2$, and the pressing device in the vacuum vessel was operated for five minutes, while heating the same at a temperature of 105° C.

Thereafter, nitrogen gas ($N_2$) was introduced into the vacuum vessel to thereby remove the reduced pressure condition, thereby rendering the interior of the vacuum vessel to be the atmospheric pressure. The substrates as compressed was left to cool as they were, thereby fixing the sealing material to both substrates.

Electric current feed wires were then soldered to the lead wire fitting part on each side of the above-mentioned first and second substrates (3, 4), thereby obtaining the electrochromic device.

In this example, the screen-printing method was employed for forming the banks, which contributed to power saving, and hence an improvement in the working efficiency.

EXAMPLE 2

In the same manner as in Example 1 above, the gel-like electrolytic solution was prepared. Also, in the same manner as in example 1 above, the first substrate (3) and the second substrate (4) were prepared.

On the surface of the ITO film of the first substrate (3), there was coated for two times by the screen-printing the thermosetting type epoxy adhesive, thereby forming the outer bank (1) in two-staged structure.

Then, as the sealing material, a film of polyethylene terephthalate was shaped in a rectangular frame with its center part having been open. This film frame in the rectangular shape was placed on the first substrate and inside the outer bank (1) with a space interval between them having been made $d_1=0.5$ mm, thereby forming the inner bank (2) having the width $W_2$ of 1 mm.

This first substrate, on which the banks had been formed, was placed in the vacuum vessel. In the meantime, the above-mentioned gel-like electrolytic solution was heated in the nitrogen gas atmosphere to lower its viscosity, after which it was applied by a dispenser on the surface of the above-mentioned substrates as enclosed by the banks in the form of a letter "X". By thus decreasing viscosity of the gel-like electrolytic solution, its application onto the first substrate could be done easily.

In the next place, the second glass substrate (4) was placed on the above-mentioned gel-like elecrolytic solution in the vacuum condition, followed by pressing the same in the same manner a in Example 1 above. After maintaining the substrates as compressed in the atmospheric pressure, electric current feed lines were soldered to the lead wire fitting part at the end part of the substrate, thereby fabricating the electrochromic device.

EXAMPLE 3

The inner bank of Example 1 above was arranged in two rows as shown in FIG. 14. The two inner banks were simultaneously formed by application of the adhesive agent through the screen-printing method. These two inner banks (2A, 2B) had their respective widths $W_{2A}$, $W_{2B}$ of about 0.5 mm, and a space interval $d_2$ between them of about 0.5 mm.

The first and second substrates were then contact-bonded in the same manner as in Example 1 above to thereby form the electrochromic device. Since this electrochromic device had the double inner banks, there was no possibility of the uncured sealing material getting over the inner bank (2B) to enter inside of the cell for the electrochromic device, or of the electrolyte which was forced out of the interior of the cell contaminating the bonded surface between the outer bank and the substrate, hence the manufacturing work could be done easily.

EXAMPLE 4

In place of the sealing material for the inner bank (2) as used in Example 1 above, a thermosetting type epoxy adhesive mixed with glass beads having a particle size of 50 μm was coated by the screen-printing method, followed by pressing the same by a plate of tetrafluoroethylene resin to cure. Using the thus manufactured substrates, the electrochromic device was fabricated in the same manner as in Example 1 above.

According to this method of manufacture, the height of the inner bank was made substantially uniform of about 55 μm, and the top surface thereof was rendered flat and smooth. With such inner bank, the gel-like electrolyte could be prevented from overflowing at the time of forming the cell for the electrochromic device, the sealed part of the cell could be maintained with a uniform gap, and further man-power-saving could be achieved as in Example 1 above.

EXAMPLE 5

In place of the sealing material for the double inner banks (2A, 2B) as used in Example 3 above, the thermosetting type epoxy adhesive mixed with glass beads having a particle diameter of 50 μm was coated by the screen-printing method, followed by pressing the same by use of a plate of tetrafluoroethylene resin to cure. Using the thus produced substrates, the electrochromic device was fabricated in the same manner as in Example 3 above.

According to this method of manufacture, the height of the inner banks could be made substantially uniform of about 55 μm, and the top surface of the banks was rendered flat and smooth, which made it difficult for the gel-like electrolytic solution to overflow from the interior at the time of forming the cell, and which could render the sealed part to be in the uniform gap. Further, since the inner bank is in the double structure as in Example 3 above, the uncured sealing material could not get over the inner bank (2B) to enter into the interior of the cell, or, the electrolyte, even if it overflows from the interior of the cell, did not reach the bonded surface between the outer bank and the substrate to contaminate the part, hence the manufacturing work could be done easily.

EXAMPLE 6

The gel-like electrolytic solution was prepared in the same manner as in Example 1 above. Also, the first substrate (3) and the second substrate (4) were prepared in the same manner as in Example 1 above.

Then, as shown in FIG. 9, the thermosetting type epoxy adhesive was coated by the screen-printing method on the surface side of the first substrate (3) where the ITO film had been formed, and the inner banks (2A, 2B) were produced thereby. This first substrate (3) was maintained at a temperature of 120° C. for 30 minutes to cure the epoxy adhesive constituting the inner banks (2A, 2B) so that they could have the final thickness of about 50 μm, the final widths $W_{2A}$, $W_{2B}$ of 1 mm, and the space interval $d_2$ between the two banks of 1 mm.

Subsequently, as shown in FIG. 10, the thermosetting type epoxy adhesive was coated by the screen-printing outside the inner banks (2A, 2B), thereby obtaining the outer bank (1). This uncured outer bank (1) had its width $W_1$ of 1.5 mm and its thickness of about 90 μm. A space interval between the outer bank (1) and the inner bank (2A) was made 0.5 mm.

Subsequently, the above-mentioned gel-like electrolytic solution was coated in a quantity of 0.50 g by the dispenser on the surface of the first substrate (3) as enclosed by the inner banks (2A, 2B). This process step was conducted in the vacuum vessel filled with nitrogen gas (N$_2$) to render it to be the inactive atmosphere. Thereafter, the nitrogen gas was purged to reduce the internal pressure of the vacuum vessel to 30 Torr, under which condition the first substrate (3) and the second substrate (4) were contact-bonded in the same manner as in Example 1 above.

After the above-mentioned process steps, the electric current feed lines were soldered to the lead wire fitting part on each side of the above-mentioned first substrate (3) and second substrate (4) to thereby fabricate the electrochromic device.

In this example, the screen-printing was done twice for the formation of the banks, whereby the man-power-saving was achieved and the working efficiency was improved.

EXAMPLE 7

In the same manner as in Example 1, the gel-like electrolytic solution was prepared. In the meantime, the first substrate (3) and the second substrate (4) were prepared also in the same manner as in Example 1 above. Then, the thermosettting type epoxy adhesive was coated by the screen-printing method on the surface side of the first substrate (3) where the ITO film had been placed, thereby forming the outer bank (1). The thus formed uncured outer bank (1) had its width $W_1$ of 1.5 mm and its thickness of about 90 $\mu m$.

Subsequently, as the sealing material, a film of polyethylene terephthalate was shaped in a rectangular frame with its center part being open. This sealing material in the rectangular frame form was placed on the first substrate (3) inside the outer bank (1) to thereby form the double inner banks (2A, 2B). These inner banks (2A, 2B) had their respective widths $W_{2A}$, $W_{2B}$ of 1 mm, a space interval $d_2$ between the inner banks (2A, 2B) of 0.5 mm, and a space interval between the outer bank (1) and the inner bank (2A) of 0.5 mm.

The first substrate, on which the banks were formed in the above-mentioned manner, was placed in the vacuum vessel. In the meantime, the above-mentioned gel-like electrolytic solution was heated in the nitrogen gas atmosphere to lower its viscosity, after which it was applied by the dispenser on the surface of the first substrate as enclosed by the banks in the form of a letter "X". By thus decreasing the viscosity of the gel-like electrolytic solution, its application to the first substrate was achieved done easily.

After the above-mentioned process steps, the second glass substrate (4) was placed on the gel-like electrolytic solution and pressed down toward the first substrate in the same manner as in Example 1 above. After holding the thus compressed substrates under the atmospheric pressure, the electric current feed lines were soldered to the lead wire fitting part at the end part of the substrate to thereby obtain the electrochromic device.

EXAMPLE 8

In place of the process step in Example 7 above, wherein the hot-setting type epoxy adhesive was coated by the screen-printing to form the outer bank (1) on the first substrate, a hot-melt type butyl rubber was coated by the dispenser to a thickness of 100 $\mu m$ and a width of 5 mm to thereby form the outer bank (1). The space interval $d_1$ between the outer bank (1) and the inner bank (2) and the space interval $d_2$ between the inner banks (2A, 2B) were each made 1 mm. In this manner the electrochromic device was fabricated.

EXAMPLE 9

In place of the process step of Example 7 above, wherein the thermosetting type epoxy adhesive was coated by the screen-printing to form the outer bank (1), hot-melt type ethylene vinyl acetate was coated by the dispenser on the first substrate to a thickness of 90 $\mu m$ and a width of 3 mm to thereby form the outer bank (1). The space interval between the outer bank (1) and the inner bank (2A) and the space interval between the inner banks (2A, 2B) were each made 1 mm. In this manner, the electrochromic device was fabricated.

EXAMPLE 10

In place of the sealing material for the inner banks (2A, 2B) as used in Example 6 above, the hot-setting type epoxy adhesive mixed with glass beads having a particle size of 50 $\mu m$ was coated by the screen-printing, followed by pressing the same with a plate of tetrafluoroethylene resin to cure. Using the thus formed substrates, the electrochromic device was fabricated in the same manner as in Example 6 above.

According to this method of manufacture, the height of the inner banks was substantially made uniform of 55 $\mu m$, and the top surface of the banks was rendered flat and smooth, which made it difficult for the gel-like electrolyte to overflow from the interior at the time of forming the cell. The method also rendered the interval of the sealed part to be uniform, and could achieve the man-power-saving as realized in Example 6 above.

As has been described in the foregoing, the method for fabrication of the electrochromic device according to the present invention comprises the steps of: forming on the surface of the first substrate the outer bank in the two-stage structure composed of the cured first-stage bank and the uncured second-stage bank, and the cured inner bank (or, forming at the peripheral positions on the surface of the first substrate the cured inner bank of the sealing material arranged in two or more rows with a space interval being provided between them, and the uncured outer bank); then placing the gel-like electrolytic solution on the surface of the first substrate as enclosed by these outer and inner banks; and bring the second substrate into contact with the top surface of the gel-like electrolytic solution to press the same down to effect the contact-bonding between the first and second substrates under a reduced pressure, thereby forming the cell.

In the above-described method for fabricating the electrochromic device, the outer bank plays the role of tight closure and fixing of the cell, while the inner bank shares the functions of the spacer for maintaining constant the cell gap and the blocking material to prevent the gel-like electrolytic solution within the cell from overflowing outside, so that there is no possibility of the gel-like electrolytic solution being forced out of the cell at the time of the contact-bonding between the substrates, whereby various meritorious effects would result such that shortage in the strength of the seal and insufficient sealing effect hardly take place, step of removing and washing the gel-like electrolytic solution which has been forced out of the cell are no longer necessary, and the step of heating the gel-like electrolytic solution to reduce its viscosity before feeding it into the cell is also no longer required. In addition, since the filling of the gel-like electrolytic solution into the cell and the sealing of the cell can be completed in a single process step, the working efficiency becomes remarkably improved. Further, owing to the fact that the tight closure of the cell is done by compression of the substrates under a reduced pressure, after completion of which the pressure condition is returned to the atmospheric, undesirable bubbles are difficult to remain in the cell with the consequence that there is no possibility of the electrolyte or the redox agent contained therein being oxidized by the residual bubbles to deteriorate the electrochromic device. Furthermore, by placing the gel-like electrolytic solution onto the first substrate in the vacuum vessel, and then pressing the electrolyte by the contact-bonding of the second substrate to the first substrate to form the cell, there would result such remarkable effect that the method is suited excellently for the continuous, mass-production of the electrochromic device in an industrialized scale accompanied by reduced production cost.

Also, by the pressure and the temperature applied at the time of compression, the sealing material constituting the inner bank is rendered difficult to deform, on account of which the cell gap is maintained constant and the optical distortion of the device decreases effectively.

Moreover, according to the present invention, the inner bank may be provided in two rows, whereby, even when the outer bank is in the single-stage structure, the electrolyte will not be forced out to the bonding surface between the outer bank and the substrate. As the consequence of this, insufficient sealing is difficult to take place, and also the uncured sealing material enters into the interior of the cell to contaminate and deteriorate the electrolyte.

Still more, according to the present invention, when the outer bank is formed in the two-stage structure, such outer bank has less portion of the uncured sealing material, hence less quantity of the uncured sealing material with the result that accuracy in the feeding quantity of the sealing material is not so strictly required. With such small quantity of the uncured sealing material for the outer bank, there is less possibility of such uncured sealing material being forced out, and also, since the uncured outer bank has a thin thickness, less stress will be imparted to the substrates after their contact-bonding to follow after curing of the sealing material with the consequence that the obtained electrochromic device has less optical distortion. Also, since the first-stage bank has previously been cured, the bonding strength between the bank and the substrate increases with the consequent improvement in reliability of the seal.

Further, when the outer bank is formed in the two-stage structure, and when each stage of the bank is formed by the printing method, the film thickness for printing may be made thin, which contributes to increase the accuracy in printing and yet more freedom is allowed to the printing conditions.

As such, the present invention possesses very remarkable effect of excellent operational reliability of the electrochromic device and of being best suited for the industrialized mass-production. Therefore, various modifications and changes may be made for the future in respect of the shape of the outer and inner banks, their numbers, their constituent materials, and the method of their formation as well as type of the gel-like electrolytic solution and the method of its feeding; also various applications of the electrochromic device may be possible, within such extent that does not impair the remarkable effect of the present invention.

What is claimed is:

1. A method for making an electrochromic device, said device comprising a first and a second substrate and an electrode formed on a major surface of each of said first and second substrates, said device further comprising an electrochromic substance layer and a gel-like electrolyte layer situated between said electrodes of said first and second substrates, said method comprising:
   (1) forming one outer bank and at least one inner bank onto one of said substrates, said banks constituting an external frame for said substrate, using a sealing material disposed at the peripheral position of said first substrate or said second substrate, on the electrode-equipped surface thereof, wherein said outer bank comprises an uncured material and said inner bank comprises a cured material, and said banks are spaced apart;
   (2) placing a gel-like electrolyte solution on the electrode-equipped surface of said first substrate;
   (3) joining said second substrate with said first substrate such that the electrode-equipped surfaces of said first substrate and said second substrate are facing each other; and
   (4) contact bonding said first substrate with said second substrate.

2. A method for making an electrochromic device, said device comprising a first and a second substrate and an electrode formed on a major surface of each of said first and second substrates, said device further comprising an electrochromic substance layer and a gel-like electrolyte layer situated between said electrodes of said first and second substrates, said method comprising:
   (1) forming one outer bank and at least one inner bank onto one of said substrates, said banks constituting an external frame for said substrate, using a sealing material disposed at the peripheral position of said first substrate or said second substrate, on the electrode-equipped surface thereof, wherein said outer bank comprises an uncured material and said inner bank comprises a cured material, and said outer bank is a two-stage structure having a greater height than the height of said inner bank, said two-stage structure comprising a first cured bank having a height which is shorter than the height of said inner bank, said first cured bank having laminated thereon an uncured bank;
   (2) placing a gel-like electrolyte solution on the electrode-equipped surface of said first substrate;
   (3) joining said second substrate with said first substrate such that the electrode-equipped surfaces of said first substrate and said second substrate are facing each other; and
   (4) contact bonding said first substrate with said second substrate.

3. The method of claim 1, comprising forming a two-stage outer bank, wherein said two-stage outer bank is taller than said inner bank, and wherein said two-stage outer bank comprises a first cured bank onto which is laminated a second uncured bank.

4. The method of claim 1, comprising forming a single stage outer bank and at least two inner banks.

5. The method of claim 2, comprising forming at least two inner banks.

6. The method of claim 1, comprising forming said outer bank and said at least one inner bank constituting the external frame of said substrates by disposing a sealing material at the peripheral position of the major surface equipped with said electrode of said first substrate or said second substrate, wherein said inner bank is made of a cured material and said outer bank is a two-stage structure, said outer bank being taller than said inner bank, wherein said outer bank is a two-stage structure made of a first cured bank which is shorter than said inner bank and an uncured bank laminated onto said first cured bank, said uncured bank laminated onto said first cured bank being narrower than said cured bank.

7. The method of claim 2, comprising forming said outer bank and said at least one inner bank constituting the external frame of said substrates by disposing a sealing material at the peripheral position of the major surface equipped with said electrode of said first substrate or said second substrate, wherein said inner bank is made of a curved material and said outer bank is a two-stage structure, said outer bank being taller than said inner bank, wherein said outer bank is a two-stage structure made of a first cured bank which is shorter than said inner bank and an uncured bank laminated onto said first cured bank, said uncured bank laminated onto said first cured bank being narrower than said cured bank.

8. The method of claim 1, comprising forming at least three banks by disposing a sealing material at the peripheral position of the major surface equipped with said electrode of said first substrate or of said second substrate, wherein said three banks comprise at least two cured and spaced inner banks and an uncured outer bank.

9. The method of claim 2, comprising forming at least three banks by disposing a sealing material at the peripheral position of the major surface equipped with said electrode of said first substrate or of said second substrate, wherein said three banks comprises at least two cured and spaced inner banks and an uncured outer bank.

10. The method of claim 1, comprising contact-bonding under reduced pressure.

11. The method of claim 2, comprising contact-bonding under reduced pressure.

12. The method of claim 1, comprising forming said outer bank and said at least one inner bank using a printing method.

13. The method of claim 2, comprising forming said outer bank and said at least one inner bank using a printing method.

14. The method of claim 1, comprising forming an inner bank containing a spacer for controlling cell gap.

15. The method of claim 2, comprising forming an inner bank containing a spacer for controlling cell gap.

16. The method of claim 2, wherein said inner bank and siad outer bank are spaced apart.

17. The method of claim 1, comprising forming at least two said inner banks, spaced apart.

18. The method of claim 2, comprising forming at least two said inner banks, spaced apart.

19. The method of claim 1, comprising forming said outer bank onto said substrate having at least one inner bank.

20. The method of claim 2, comprising forming said outer bank onto said substrate having at least one inner bank.

21. The method of claim 1, comprising forming a laminated outer bank comprising a first layer made of a cured material and a second layer laminated thereon comprised of an uncured material, wherein said second layer is narrower than said first layer.

22. An electrochromic device comprising a first substrate and a second substrate, each having an electrode formed thereon, said device further comprising an electrochromic substance and an electrolyte held between said first substrate and said second substrate, wherein the surfaces of said first substrate and said second substrate equipped with said electrodes face inward of said device, said electrochromic device comprising at least one outer bank and at least two inner banks formed of a sealing material disposed on the peripheral position of the electrode-equipped surfaces of said first substrate and said second substrate, wherein said at least two inner banks do not bond said first and second substrate, and said at least one outer bank bonds said first substrate and said second substrate.

23. The electrochromic device of claim 22, wherein said at least said two inner banks are bonded to either said first substrate or said second substrate.

24. The electrochromic device of claim 22, wherein at least one of said inner banks contains a spacer for controlling cell gap.

25. The electrochromic device of claim 22, wherein said at least one outer bank is a two-stage structure.

26. The electrochromic device of claim 22, wherein said inner banks are spaced apart.

27. The electrochromic device of claim 22, wherein said outer bank and said inner banks are all spaced apart.

28. The electrochromic device of claim 22, wherein said outer bank is a two-stage structure in which one of the stages is narrower than the other stage.

29. The electrochromic device of claim 22, wherein said electrode comprises tin oxide or indium tin oxide.

30. The electrochromic device of claim 22, wherein said electrochromic substance comprises tungsten oxide or molybdenum oxide.

31. The electrochromic device of claim 22, wherein said outer bank has a width of from 0.6 to 30 mm.

32. The method of claim 1, wherein said banks are spaced aparat by 0.2 to 5 mm.

33. The method of claim 16, wherein said inner bank and said outer bank are spaced apart by 0.1 to 5 mm.

34. The electrochromic device of claim 22, wherein said outer bank and said at least two inner banks are spaced apart 0.2 to 5 mm.

* * * * *